US011948331B2

(12) United States Patent
Chen et al.

(10) Patent No.: US 11,948,331 B2
(45) Date of Patent: Apr. 2, 2024

(54) GUIDED BATCHING

(71) Applicant: Lyft, Inc., San Francisco, CA (US)

(72) Inventors: Long Chen, London (GB); Benjamin Alex Haines, London (GB); Luca Del Pero, London (GB)

(73) Assignee: Lyft, Inc., San Francisco, CA (US)

(*) Notice: Subject to any disclaimer, the term of this patent is extended or adjusted under 35 U.S.C. 154(b) by 0 days.

(21) Appl. No.: 18/132,127

(22) Filed: Apr. 7, 2023

(65) Prior Publication Data

US 2023/0316568 A1 Oct. 5, 2023

Related U.S. Application Data

(63) Continuation of application No. 17/142,045, filed on Jan. 5, 2021, now Pat. No. 11,651,513, which is a
(Continued)

(51) Int. Cl.
*G06T 7/00* (2017.01)
*G01C 21/36* (2006.01)
*G06F 16/583* (2019.01)
*G06T 7/136* (2017.01)
*G06T 7/73* (2017.01)
*G06T 17/05* (2011.01)
*G06V 10/26* (2022.01)
(Continued)

(52) U.S. Cl.
CPC ............ *G06T 7/74* (2017.01); *G01C 21/3638* (2013.01); *G06F 16/583* (2019.01); *G06T 7/136* (2017.01); *G06T 7/97* (2017.01); *G06T 17/05* (2013.01); *G06V 10/26* (2022.01); *G06V 10/7635* (2022.01); *G06V 10/803* (2022.01); *G06V 20/56* (2022.01); *H04N 23/698* (2023.01); *G06T 2207/10028* (2013.01); *G06T 2207/30244* (2013.01); *G06V 10/16* (2022.01)

(58) Field of Classification Search
None
See application file for complete search history.

(56) References Cited

U.S. PATENT DOCUMENTS

2015/0070352 A1   3/2015   Jones et al.

OTHER PUBLICATIONS

Engel, Jakob, et al., "LSD-SLAM: Large-Scale Direct Monocular SLAM", Aug. 2017 (Year: 2017), pp. 1-16.
(Continued)

*Primary Examiner* — Nicholas R Wilson
(74) *Attorney, Agent, or Firm* — Sheppard Mullin Richter & Hampton LLP

(57) ABSTRACT

The present invention provides a method of generating a robust global map using a plurality of limited field-of-view cameras to capture an environment.
Provided is a method for generating a three-dimensional map comprising: receiving a plurality of sequential image data wherein each of the plurality of sequential image data comprises a plurality of sequential images, further wherein the plurality of sequential images is obtained by a plurality of limited field-of-view image sensors; determining a pose of each of the plurality of sequential images of each of the plurality of sequential image data; determining one or more overlapping poses using the determined poses of the sequential image data; selecting at least one set of images from the plurality of sequential images wherein each set of images are determined to have overlapping poses; and constructing one or more map portions derived from each of the at least one set of images.

20 Claims, 10 Drawing Sheets

Related U.S. Application Data continuation of application No. 16/694,516, filed on Nov. 25, 2019, now Pat. No. 10,914,605.

(51) Int. Cl.
 *G06V 10/762* (2022.01)
 *G06V 10/80* (2022.01)
 *G06V 20/56* (2022.01)
 *H04N 23/698* (2023.01)
 *G06V 10/10* (2022.01)

(56) References Cited

OTHER PUBLICATIONS

Forster, Christian, et al., "Collaborative Monocular SLAM with Multiple Micro Aerial Vehicles", 2013 IEEE/RSJ International Conference on Intelligent Robots and Systems (IROS), Nov. 3-7, 2013 (Year: 2013), 8 pages.

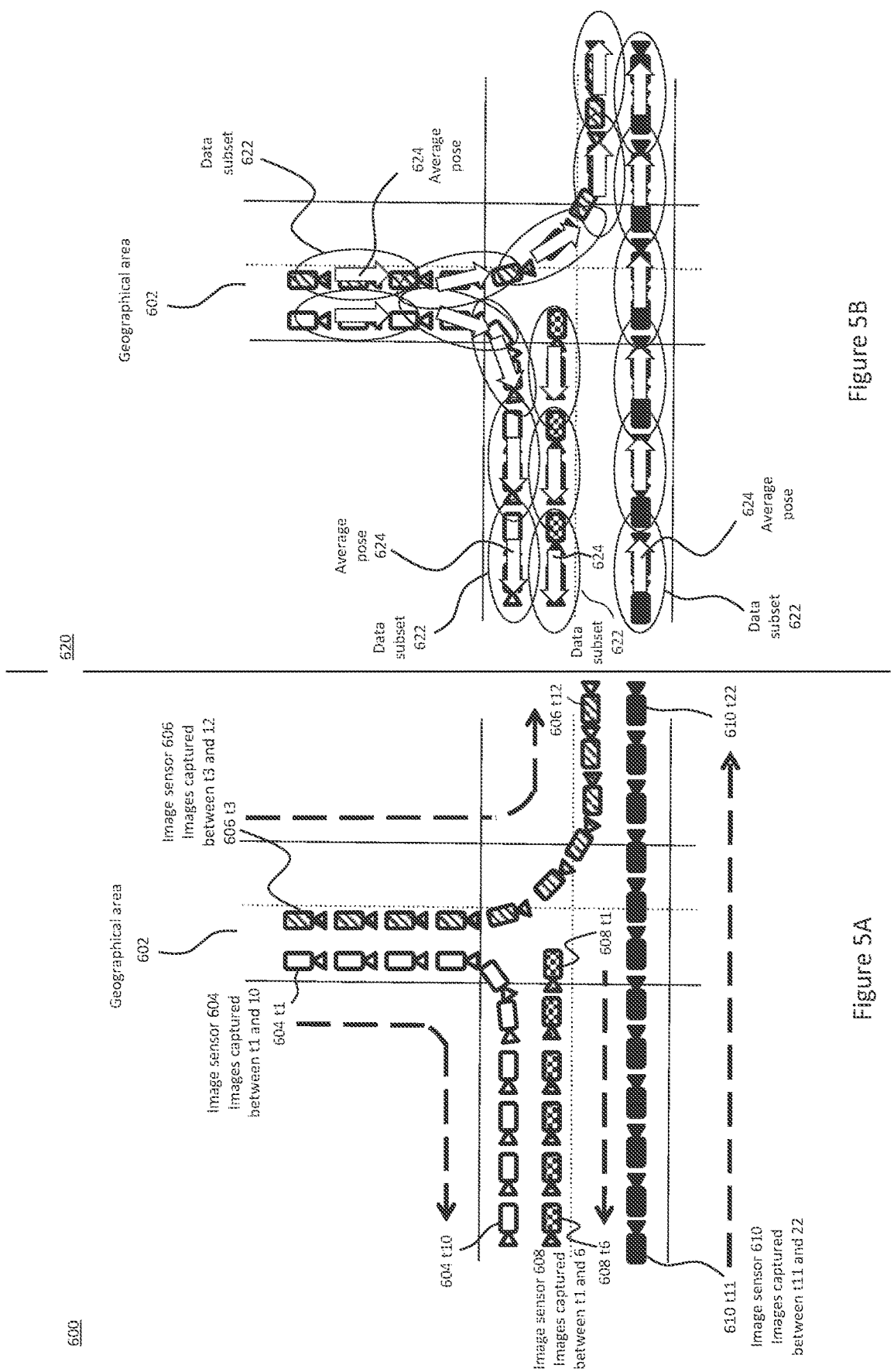

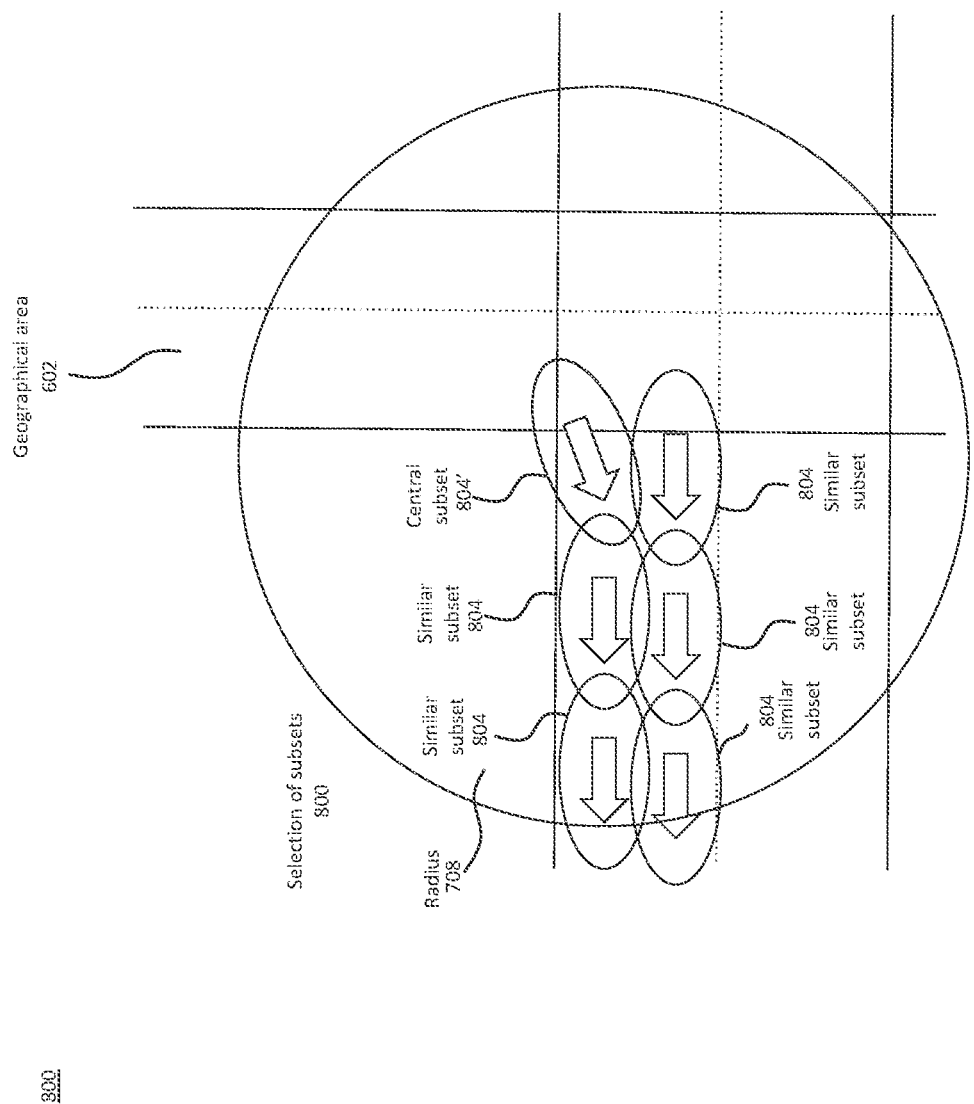

GUIDED BATCHING

CROSS-REFERENCE TO RELATED APPLICATIONS

This application is a continuation of U.S. patent application Ser. No. 17/142,045, filed on Jan. 5, 2021 and entitled "GUIDED BATCHING", which is a continuation of U.S. patent application Ser. No. 16/694,516, filed on Nov. 25, 2019 and entitled "GUIDED BATCHING", now U.S. Pat. No. 10,914,605; all of which are incorporated in their entireties herein by reference.

FIELD OF THE INVENTION

The present invention relates to a method of generating a map. More particularly, the present invention relates to a method of generating a robust global map using a plurality of single-viewpoint or limited field of view cameras for obtaining image data to be processed by a map generation system.

BACKGROUND

For the purposes of real-world map generation, various imaging techniques and combinations of imaging devices can be employed. In order to create a robust map of high visual quality, dedicated mapping vehicles equipped with multiple cameras are typically used along with, in some cases, additional sensors such as LiDAR sensors. Each of these cars is provided with multiple cameras attached to it where each camera is orientated differently, in order that the multiple cameras work together to capture a 360-degree view of the surroundings. The cameras are usually attached to the vehicles externally, typically on the roof of the vehicle, at an appropriate height above the ground to capture images containing fewer obstacles obscuring landmarks or roads.

However, there are several operational and technical difficulties with these multiple camera systems such as having to accurately calibrate all the sensors being used and needing the resources to constantly perform maintenance of the data capturing equipment. More importantly, attaching multiple camera systems on to vehicles in this way typically requires a large financial investment and can result in a high risk of damaged or stolen cameras as the cameras are mounted externally, and so these camera arrangements are too expensive to be deployed in very large fleets of vehicles. As a result, multiple camera systems are typically restricted in the amount of data that can be collected to generate map data due to these constraints.

SUMMARY

Aspects and/or embodiments seek to provide a method of generating a robust three-dimensional global map using single-viewpoint or limited field of view cameras for obtaining image data to be processed by a map generation system.

According to a first aspect, there is provided a method for generating a three-dimensional map comprising: receiving a plurality of sequential image data wherein each of the plurality of sequential image data comprises a plurality of sequential images, further wherein the plurality of sequential images is obtained by a plurality of limited field of view image sensors; determining a pose of each of the plurality of sequential images of each of the plurality of sequential image data; determining one or more overlapping poses using the determined poses of the sequential image data; selecting at least one set of images from the plurality of sequential images wherein each set of images are determined to have overlapping poses; and constructing one or more map portions derived from each of the at least one set of images.

Optionally the limited field of view comprises image data from a single viewpoint.

Optionally, the limited field of view comprises image data having less than a 360-degree field of view in one plane.

Optionally, the step of determining one or more overlapping poses further comprises a step of determining two or more of the plurality of sequential images having overlapping poses.

Optionally, the one or more overlapping poses comprises one or more overlapping limited fields of view.

Optionally, the one or more overlapping limited fields of view are determined using a threshold variance between the limited fields of view.

Optionally, the step of determining one or more overlapping poses is based on using at least one of a location, a direction, and a visual similarity between the one or more overlapping poses.

Optionally, the method further comprises the step of refining the determination of the pose of each of the plurality of sequential images of each of the plurality of sequential image data based on the overlapping poses of the selected set of images.

Optionally, the selected set of images comprises a plurality of images having diverse and smooth combined fields of view between images in the set.

Optionally, the step of determining one or more overlapping poses further comprises generating a metric between different images using any one of or any combination of: neural networks that are configured to identify similarities between collected images; image descriptors; global image descriptors or local image descriptor.

Optionally, the method further comprises a step of determining a similarity weighting for each of the images relative to each other: wherein the step of selecting at least one set of images the determined similarity weightings.

Optionally, the method further comprises the step of receiving metadata associated with the plurality of sequential image data, wherein metadata comprises any one or more of: location data; environmental data; inertial measurement data; or semantic data.

Optionally, the step of selecting at least one set of images is based on similarity between the metadata associated with each image.

Optionally, the method further comprises the step of aligning the one or more map portions using the metadata.

Optionally, the step of constructing one or more map portions comprises constructing a plurality of map portions; and further comprises a step of determining an alignment between each of the plurality of map portions.

Optionally, the step of determining an alignment comprises a step of optimisation.

Optionally, the method further comprises a step of aligning each of the one or more map portions to a global map.

Optionally, the method further comprises a step of selecting at least one sub-set of images from the plurality of sequential images.

Optionally, the step of selecting at least one sub-set further comprises a step of determining a deviation of at least some of the plurality of sequential images and a comprises selecting a sub-set of the at least some of the plurality of sequential images determined to be a straight sub-set or a turn sub-set based on the determined deviation.

Optionally, the step of determining a straight sub-set is based on determining a low deviation and the step of determining a turn sub-set is based on determining a high deviation.

Optionally, the step of selecting at least one set of images from the plurality of sequential images comprises selecting a plurality of sub-sets of images.

Optionally, the method further comprises a step of filtering wherein the step of filtering comprises determining one or more images within the sub-set having a determined deviation above a threshold deviation, wherein the threshold deviation is determined based on whether the sub-set is categorised as a straight sub-set or a turn sub-set; and a step of removing any images from the sub-set exceeding the threshold deviation.

Optionally the method further comprises a step of filtering wherein the step of filtering comprises determining one or more images within the sub-set having a determined deviation below a threshold deviation, wherein the threshold deviation is determined based on whether the sub-set is categorised as a straight sub-set or a turn sub-set; and a step of removing any images from the sub-set exceeding the threshold deviation.

Optionally, the determined deviation comprises a standard deviation.

Optionally, the plurality of sequential image data is obtained by a plurality of transportation vehicles.

Optionally, the plurality of sequential image data is obtained from vehicle travel routes.

Optionally, each of the at least one sub-set of images comprises at least thirty image frames.

Optionally, each of the at least one set of images comprises at least one thousand image frames.

According to a further aspect, there is provided a computer program product operable to perform the method of any preceding claim.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

BRIEF DESCRIPTION OF DRAWINGS

Embodiments will now be described, by way of example only and with reference to the accompanying drawings having like-reference numerals, in which:

FIG. 5A illustrates example vehicle trajectories depicted by sequences of image sensors which illustrate the positions of each capture of sequential image data;

FIG. 5B illustrates example groupings of the sequential image data depicted in FIG. 5A;

FIG. 7 shows an example selection of data subsets from the data of FIGS. 6A, 6B, and 6C, FIGS. 8A and 8B illustrate examples of graph construction and graph cutting from the data illustrated in FIGS. 6A to 6C.

Figure 1:
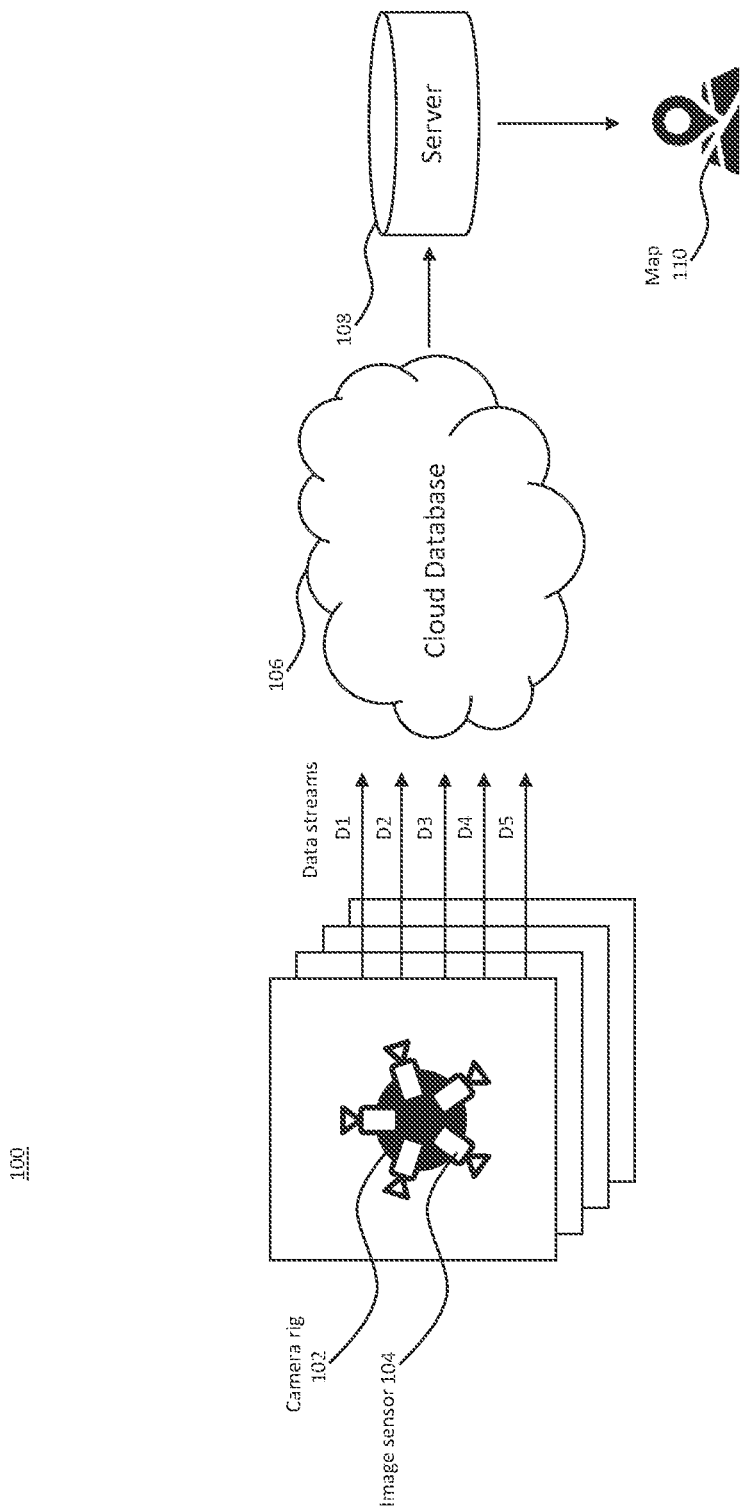
FIG. 1 illustrates a high level overview of an existing map data capture system using a 360 degree camera rig.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Conventional ways of capturing image data for visual mapping/map generation, for example as shown in FIG. 1, can result in high costs due to the use of cameras or camera arrangements 100 that are large, complex, and unwieldy. In this example, one or more image data streams labelled as D1 to D5 obtained from each image sensor 104 of a camera rig 102 are output into a cloud database 106 and either processed for map generation or stored for processing by a server 108. Although, with the use of camera rigs, such methods can obtain 360-degree coverage of geographical areas and can also result in accurate and robust quality map 110 generation, the expensive system required for data collection and the time required to process the data gathered limits scalability. There are also some systems that implement other sensors such as LiDAR as well and these are even more costly and increases the computation requirements further.

Alternatively, using single-viewpoint or limited field of view (intended to be understood as having a field of view of less than 360-degrees in one plane) cameras such as those in a typical "smartphone", i.e. a mobile telephony device equipped with image sensors, or any other data-enabled mobile device with a limited field of view image sensor, to obtain image data for map generation can reduce costs of visual mapping of the real world with the use of off the shelf hardware that is relatively readily available. As these devices are plentiful, cheap to procure and easy to deploy, they can provide a scalable part of a map generation system. However, there are difficulties faced with (re)construction of maps using data from these devices and correctly connecting and aligning map data generated using data from these devices due to these sensors capturing only a two-dimensional view of the world.

Using existing techniques for map generation with single-viewpoint or limited field of view cameras will typically result in failure of (re)construction due to lack of redundancy and partial visual coverage of the limited field of view data from these devices. The level of redundancy and visual coverage of an area can increase with the number of vehicles driving through it, however, thus more vehicles generating data can result in the combined data from all vehicles reaching the required redundancy and visual coverage, in the combined data.

For example, if the only dataset used for map generation is image data obtained from one vehicle, any problem associated with that dataset such as lack of focus or occlusions in the images will result in an inaccurate map. In contrast, multiple overlapping data for the area and so for example ten vehicles traversing the same geographical area provides room for error and/or redundancy in the obtained data such that, if image data from two or three vehicles include occlusions for example, the map generation process can still rely on the "good" image data from the remaining vehicles for map generation.

Lack of full visual coverage is problematic in current imaging techniques for map generation as existing techniques tend to fail when processing images corresponding to each other which view the same scene but where there is a difference in viewing angle of more than approximately thirty degrees between their respective fields of view. Therefore, the more vehicles traversing an area, the higher the probability that the image data obtained covers the area with no large angles between images of any landmark or gaps in the data collected.

It is particularly important for scalable methods to be available to process image data and generate maps, such as for visual maps deployed in the cloud used for localisation (and for developments of further applications such as trajectory simulations for autonomous vehicles, urban planning, and augmented reality for example).

In order to overcome the drawbacks of current methods and map generation techniques which rely on the use of 360-degree camera data to generate a map of substantially high quality using limited field of view cameras, the use of multiple transportation vehicles is used to provide visual redundancy in the data collected using limited field of view cameras. Techniques will now be described for use to substantially optimise grouping of the collected image data for map generation. the use of sequential structure from motion (SfM) techniques can be used on the image data to create map portions. Image data obtained from different locations or roads can be grouped into different subsets of data and processed in parallel and/or independently. Image data having different pose(s) can be included in a set of image data to provide a wider field of view that possible with only one limited field of view sensor whilst allowing the raw data to be collected using only limited field of view sensors. Image data obtained at different times can be used in the same set of data to generate map portions that reflect multiple times of day. Image data of varying angles can be collected together in sets of image data to construct map portions. By substantially overcoming at least some of the problems that arise from using a single viewpoint or limited field of view camera, a map generation system of an embodiment is capable of generating a map of similar or better quality than one created using data obtained using 360-degree camera arrangements.

Referring to FIGS. 2 to 10, example embodiments relating to a method for generating a three-dimensional global map will now be described. The disclosed embodiments provide a method for substantially robust and scalable visual mapping using a "guided" process to generate sets of image data, otherwise known as "batches", from which to build map portions. Map portions resulting from processing the sets of image data, are connected and aligned with each other and/or to a global map (i.e. a collection of reconstructed map portions aligned to a global common reference co-ordinate system).

In example embodiments, an imaging device can be a single-viewpoint or limited field of view camera such as a typical "smartphone", i.e. a mobile telephony device equipped with limited field-of-view (i.e. non 360-degree visibility in one plane) image sensors, or any other data-enabled mobile device with an image sensor operable to obtain image data for map generation. Alternatively, the imaging device may be any form of limited field of view image sensor capable of capturing and communicating image data to a map generation system for the image data to be processed.

Particularly, example embodiments disclosed herein provide methods for guided map generation using sequential image data, otherwise known as data collects or data streams, obtained from imaging devices attached to geographically traversing vehicles where the sequential image data from multiple imaging devices/vehicles are gathered into multiple subsets of image data for processing.

In example embodiments, sequential image data can be obtained by imaging devices attached internally or externally to transportation vehicles, such as a car or motorcycle, capable of gathering sequential image data using limited field of view imaging devices as vehicles navigate across vehicle paths and transmitting image data to a data storage or map generation system where the data is received and processed.

In example embodiments, sequential image data can be defined as a sequence of image frames, captured over a period of time as a vehicle moves within an environment. In example embodiments, sequential image data may further be defined as an orderly set of image frames, ordered by image frames with respect to time, location, and/or enlargement or diminution of a particular scene or part of a scene observed by the imaging device. In some embodiments, each image frame may also be provided to the system with its corresponding location data for example GPS coordinates of an image frame or a group of image frames which may be used to group image data together.

Figure 2:
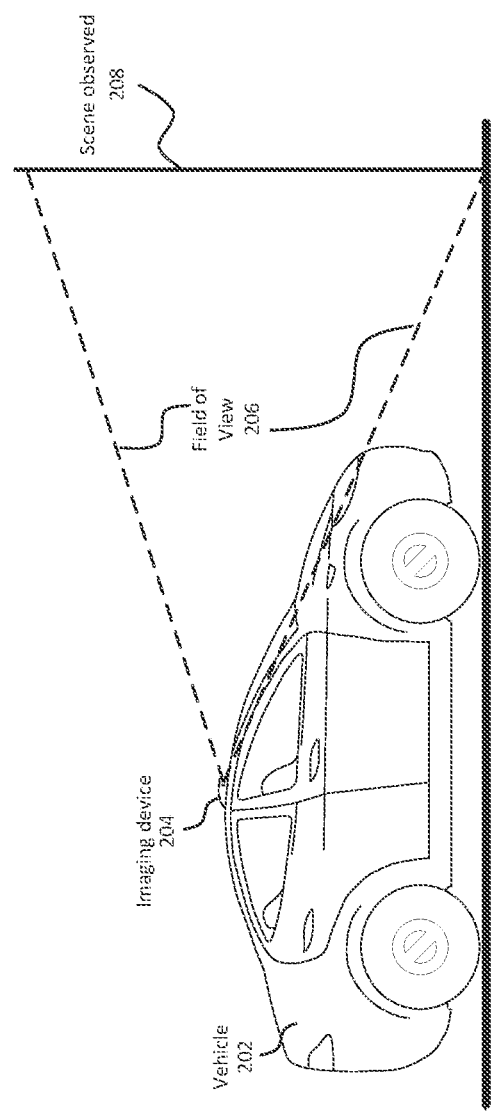
FIG. 2 shows a side view of an example vehicle used to obtain sequential image data for map generation.

FIG. 2 illustrates an example vehicle 202 obtaining image frames having limited field of view which are suitable for map generation. In particular, this figure depicts the example scenario 200 from a side plan view for simplicity. In this embodiment a vehicle 202 is shown navigating an environment (for example driving along a road) and is provided with an imaging device 204. Although the imaging device 204 is positioned on top of the vehicle 202, the imaging device 204 may alternatively be internal to the vehicle 202. The field of view 206 can vary depending on the placement of the imaging device 204 placed on or in the transportation vehicle 202. The scene observed by the imaging device 204 is illustrated by the vertical line 208 but it will be appreciated that the image sensor will capture reflected light from a variety of scenes at varying distances depending on the environment. The scene observed 208 is represented as a two-dimensional view, however it is possible to reconstruct three-dimensional views from the images obtained in order to generate a three-dimensional map.

Guided map generation determines and processes sets or groups (or "batches") of sequential image data that can be located in or view the same scene/environment, or parts of a scene/environment, within an image such as buildings, landmark, and road signs, or any other similarities, in order to connect and align overlapping areas of determined sets of image data to output a robust three-dimensional global map, or to further refine the global map, with substantially optimal visual redundancy. The three-dimensional global map can for example include, however it is not limited to, a set of image poses, and structures viewed by the imaging devices. In some embodiments, a map generation system, as illustrated as 404 in FIG. 3, uses prior knowledge of the world, such as the knowledge of road names or landmarks, or GPS data for each image, in order to initialize the positionings of grouped map portions to be connected and aligned to each other.

Each collect of sequential image data includes images taken typically at regular time intervals during a journey of a vehicle using a single or limited field of view camera/image sensor. In at least one embodiment, the process receives multiple collects of sequential image data. For each of the images in each of the plurality of collects of sequential image data, a pose is determined. This is typically an approximate pose, to lower computation requirements for the determination. Using the approximate pose (or determined/precise pose), a determination is made of which images overlap within and/or between collects using their determined poses—the overlap can be determined by a variety of methods but in embodiments it can include any or any combination of location, orientation and/or visual similarity between images/poses of images. Using the determination of overlap, and optionally other metadata, sets of image data can be constructed across the collects of sequential image data received where each set is typically associated with a certain zone, volume or area of the environment, map or global map (otherwise known as a segment of the global map). Creating sets of image data from data within multiple collects, is guided by the location and overlap of the data in the set. To the extent possible, the sets contain images that overlap such that a wider field of view can be obtained of the zone/volume/area of the environment/map/global map in order to construct a map portion. From the sets, typically SfM techniques are used to construct a map portion for each set of image data. Following this, each map portion is aligned with each neighbouring map portion and/or against a global map.

To determine whether there is overlap in poses, a threshold approach can be used where a threshold is set to determine the degree of location, orientation and/or visual similarity between images that is required in order to be determined as overlapping.

Optionally, once the set of data is collected and/or a map portion is constructed, a more accurate determination of the pose of each of the images can be made.

If possible, the sets of images have diverse and smooth combined fields of view or aggregated fields of view or overlapping fields of view either when combined or processed together or processed using for example an SfM technique or similar approach.

Optionally, determining overlapping poses can optionally involve generating a metric between different images using any one of or any combination of: neural networks that are configured to identify similarities between collected images; image descriptors; global image descriptors or local image descriptor.

Optionally, generating the sets of image data can involve determining a similarity weighting for one or more images or between one or more images or within a set of images or sub-set of images, or between sub-sets or sets of images.

Other data or "metadata" that might be used includes location data, for example from satellite navigation or through a determination of pose or another localisation technique; environmental data; inertial measurement data for example from an IMU; and/or semantic data. Building the sets of image data can take into account some or all of this metadata or that metadata which is available for the images.

Aligning the map portions can be accomplished by an optimisation process and/or by using common data such as common images between sets of data to align or constrain alignment of points within each map portion together. Optionally the map portions can be aligned to a global map at the same time, afterwards, or before being aligned to each other.

Figure 3:
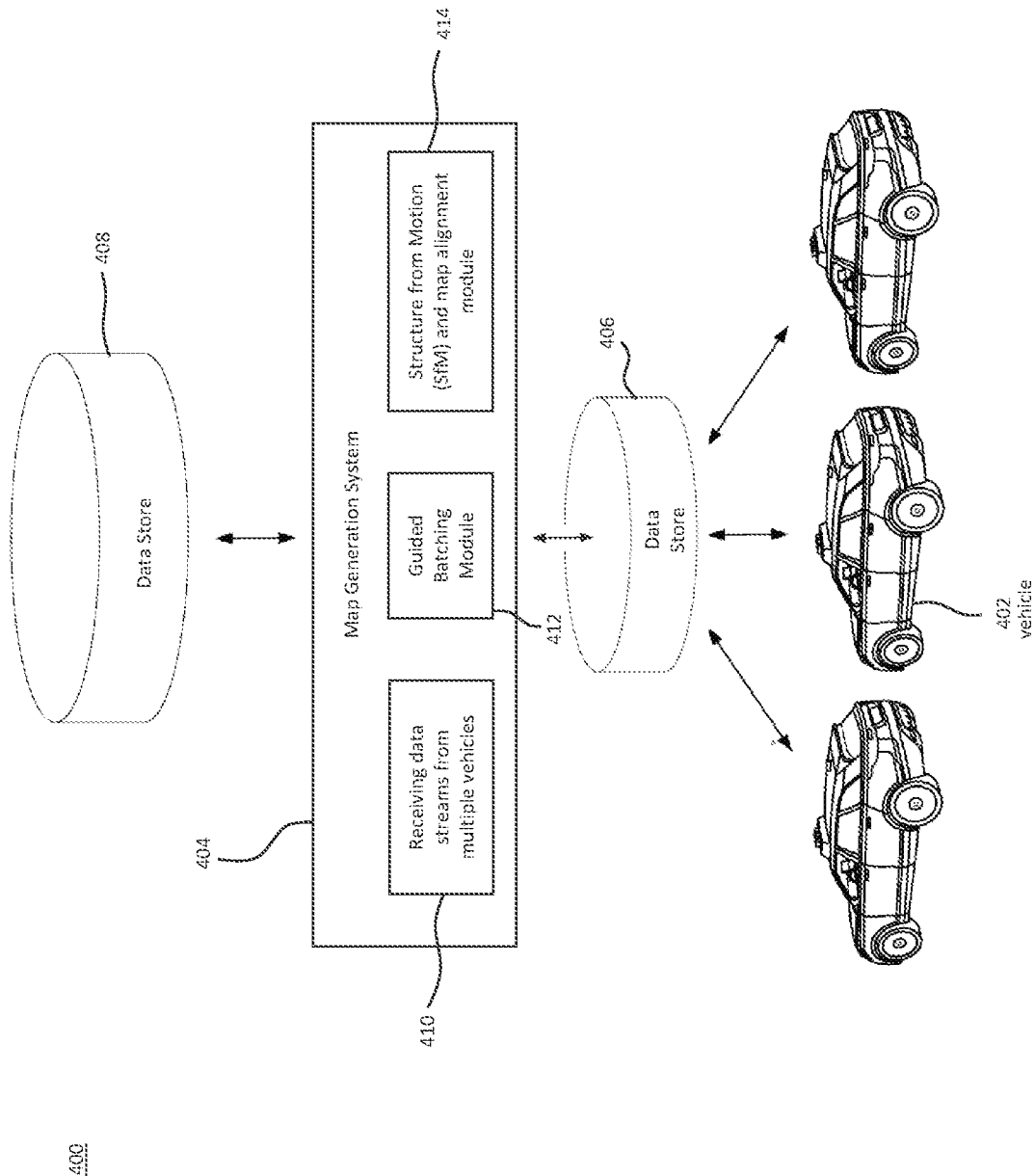
FIG. 3 illustrates an example system for collecting mapping data, according to an embodiment.

FIG. 3 illustrates a simplified version of a system 400 according to an example embodiment. The system 400 shown includes a map generation system 404, and data stores 406 and 408 which store image data obtained from multiple transportation vehicles 402. In some embodiments, data store 408 can be a global database storing data obtained from different geographical areas, or historical data for example. The map generation system 404 comprises a module 410 for receiving data streams from the multiple transportation vehicles 402, a "guided batching" module 412 for determining poses and other similarities for the association of image data and grouping of image data segments into map portions, and a module dedicated to applying SfM and connecting and aligning map portions for robust and scalable global map generation 414. In some embodiments a navigation system may also be implemented in order to use the map from the map generation system 404. In some embodiments, there may be a road network navigation system or otherwise which may be tied to the vehicle travel routes or paths. Various approaches may be used and applied to the navigation of the transportation vehicle in order to connect real world data to the map generation system 404.

Figure 4:
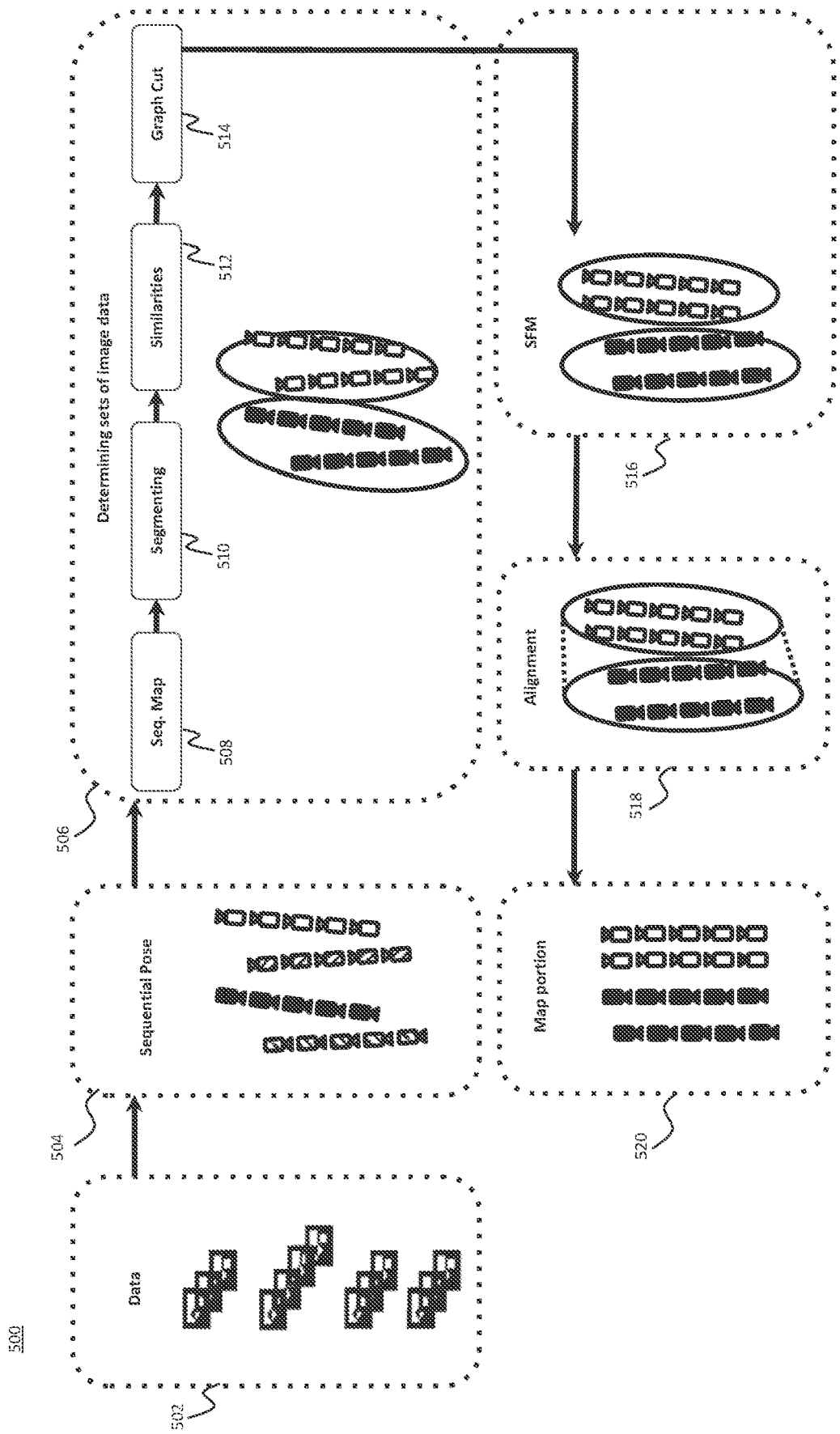
FIG. 4 shows a flowchart highlighting the steps of an example implementation according to an embodiment, focusing on the grouping of sequential image data for map generation.

FIG. 4 illustrates a flowchart 500 showing an overview of the steps for outputting a fully generated, or (re)constructed, map using sequential image data 502. Each sequence of image data 502 (or "collect" of image data) is obtained by imaging devices attached to geographically traversing vehicles. However, example embodiments seek to describe a method of processing obtained sequential image data 502 so alternatively data may have been previously stored in a database for processing.

The image data 502 is processed by a photogrammetric imaging technique 504, such as SfM, which can also be used to generate sequential pose data. Photogrammetry is known in the art as the extraction of measurements from image data. In example embodiments, the output of performing SfM can be a generated map. Also, in some embodiments, the output may further include, however not limited to, a drawing, a measurement, or a 3D model of real-world objects or scenes as identified in the image data. In the example embodiment of FIG. 4, sequential SfM is implemented in step 504, in order to reconstruct poses of data streams and obtain a sequential map 508. Particularly in this example, SfM is run for each data stream (or "collect") in order to recover pose priors of the image frames that collectively form the sequential image data. This in itself, however, does not create a fully generated robust map due to misalignments of image frames in the sequential map 508, in particular misalignments of image frames across multiple sequential maps generated from multiple collects, and noise in the data which needs to be corrected.

In order to overcome the lack of robustness from the use of single viewpoint or limited field of view cameras, sequences of image data 502 within the sequential map 508 can be segmented (grouped together) into subsets of image data 510. By making associations between each of the individual imaging devices or data corresponding to images that are in the same geographical location, or have similar orientation, or observe the same scene or parts of the same scene for example, subsets of image data can be grouped into sets of image data. Example embodiments seek to determine and group together corresponding image data which carry overlapping data, or data similarities, in a similarity assessment step 512. For example, by determining overlapping poses between a plurality of sequences of image data, and applying SfM to determine map portions, substantially robust and scalable map portions 520 can be generated using single-viewpoint or limited field of view cameras attached to vehicles travelling across geographical areas. Overlapping poses which can exist between images can provide alignment/correlation points for neighbouring subsets of image data or sets of image data or map portions to be connected together for map (re)construction or map (re)generation.

FIGS. 5A and 5B show example vehicle trajectories illustrated as image sensors 604, 606, 608, and 610. As shown in FIGS. 5A and 5B, several vehicles travel along vehicle paths within the geographical area 602, each with image sensors 604, 606, 608, 610 that obtain and store sequential image data 502 for processing. Images are captured between times t1 and t10 for image sensor 604, represented as 604 t1 to 604 t10. Images are captured between times t3 and t12 for image sensor 606, represented as 606 t3 to 604 t12. Images are captured between times t11 and t22 for image sensor 610, represented as 610 t11 to 610 t22. Images are captured between times t1 and t6 for image sensor 608, represented as 608 t1 to 608 t6. Image data of scenes or the environment such as buildings or road signs can also be obtained in some embodiments in order to assist the grouping of sequential image data into subsets of image data 510 and further then for the purpose of determining map portions 506 to be connected and aligned as illustrated as 518 in FIG. 4.

For illustration purposes, only single trajectories for each path are shown, however, it is to be acknowledged that the same vehicle or other vehicles may traverse along the same or similar path to obtain overlapping sequential image data 502 for those trajectories. In some embodiments, for vehicles obtaining image data from substantially the same location to show overlapping trajectories, there can be differences in the orientation of the images obtained and the timestamps of when each image was obtained for example, which means the scene observed by the two vehicles may differ substantially. For example, the image data maybe collected during two contrasting environmental conditions. Therefore, it can be preferable to have large datasets of overlapping data in order to overcome lack of redundancy and to collect data across a variety of times of data and weather conditions. In example embodiments, the overlapping subsets and sets of image data can be connected and aligned with the knowledge of the real-world and layers of image data obtained by multiple vehicles travelling along partially or completely overlapping trajectories.

Trajectories of image sensors 604 and 606 illustrate turn paths of sequential image data (i.e. collects) whereas trajectories of image sensors 608 and 610 illustrate straight paths travelled by the vehicle. In example embodiments, by virtue of travelling along a turning path, the image data 502 can include a range of image metadata, such as varying pose data. Vehicle "turn" data can be particularly useful as this provides several different viewpoints.

Using single-viewpoint or limited field of view cameras cannot typically be used to build robust maps of intersection points as, for example, the only data obtained are by two vehicles traversing through an intersection orthogonal to each other will be visually dissimilar, so the map generation process is likely to fail as the relative viewing angle is ninety degrees and thus too large for identifying common landmarks between the collects of each vehicle.

Vehicle turn data provides smooth changes in image sensor viewpoint and greatly increases the visual coverage of corresponding areas. By smooth, it should be understood that this term refers to the nature of changes between image viewpoints of an object or landmark as the object or landmark is observed across multiple images captured of the object or landmark from different viewpoints—having a smooth change between these images would mean having a set of images showing the object or landmark from a variety of slightly different and evenly spaced poses rotating about the object or landmark between images. However, simply having multiple vehicles traversing through an area is not enough and thus a method for grouping image data into sets of image data to be connected and aligned is further required to ensure each map portion has sufficient redundancy and visual coverage and can be then globally aligned. The method in at least some embodiments seeks to identify images from one or more collects that observe points, landmarks or objects where each image observes these from a variety of poses. The identified images are grouped into a set of images that captures a set of observations of the point, landmark or object from multiple poses where the difference between poses of the set of images results in a smooth change between poses of the observation of the point, landmark or object between images.

Sub-sets of the image data from sequential image data can be grouped or batched together into sets of image data, which can be classified as turn subsets or straight subsets, for constructing sets and thus map portions. Turn subsets and straight subsets of image data are determined using for example the deviation in viewing angle determined between images within the sub-sets and sets of image data—where there is a large deviation the set can be classified a turn subset and where there is little deviation in orientation the set can be classified a straight subset. The deviation calculation or metric used can be a standard deviation. Sets of image data can then be constructed using either turn subsets or straight subsets alone, or to include a mix of turn and straight subsets. Filtering can be performed on each of the sets of image data to remove images that increase the variance or decrease the variance of orientation between images in the set of image data to increase the certainty that the set is categorised correctly.

Example embodiments seek to provide a method for generating a robust and scalable three-dimensional map portion 520 by segmenting datasets of sequential image data into groupings. Each of the subsets of image data are collected together to cover a particular geographical area, for example within an urban area. Additionally, in example embodiments, each of the geographical areas may be covered by multiple subsets of image data or overlapping subsets of image data. In some embodiments, subsets of sequential image data can share subsets of image data which can later be used to "match" areas of the global map data together to generate a robust and reliable global map. By way of segmenting sequential image data, it can become substantially easier to define a dominant orientation or pose of grouped image data, provides finer grained units of grouped image data, and in some embodiments also can prove more efficient for map generation than combining image data at frame level.

FIG. 5B illustrates grouping 620 sequential image data, as depicted in FIG. 5A into subsets and sets according to an embodiment. More particularly, FIG. 5B shows an example embodiment where the orientations of vehicles along their respective trajectories are different.

FIG. 5B shows image data obtained from each trajectory grouped into sub-sets of image data 622, some of which subsets are geographically "neighbouring" to each other. In some embodiments, an average pose 624 of all image frames within the subset of image data 622 can also be calculated.

In some embodiments, in order to process dominant pose/average pose of subsets 622 of image data and determine the directional path of the vehicle, the pose of each image within each of the subsets 622 is determined along with its deviation from the average pose 624 of the subset. Thus, in order to classify each set of image data as a straight or turn set, the change in deviation or standard deviation over images within the subset is determined. The determined deviation between poses of each of a sequence of images can provide an indication of whether an image data set is a straight trajectory, which is a predominantly unidirectional sequence of images, or a turn trajectory of a sequence of images that changes in orientation during the sequence. The collection of straight and turn sets provide the elements that can be aligned together to form a framework of interconnected elements in order to output a map.

Sequential image data is typically segmented into approximately thirty frames per subset of image data; however, embodiments may be capable of processing varying sizes of image data subsets and it can also be possible to process a varying number of image frames. Thirty image frames can be seen as an example subset size as typical paths of vehicles can be misunderstood if subset sizes are too small and may lead to confusion or duplication in categorising subsets as straight or turns if subset sizes are too large. The step of segmenting image data creates subsets that are relatively straightforward to process by the map generation system 404.

As shown as step 512 in FIG. 4, neighbouring subsets of image data are determined for each subset of sequential image data across all data streams through similarity detection or identification in order to allocate subsets of image data into sets of image data. In example embodiments, neighbouring subsets of image data can be understood as those locally, directionally, and/or visually similar subsets, although it is not limited to said properties. In example embodiments, all of local, directional, and visual similarities are considered, however, in some embodiments subsets of sequential image data can be further grouped based on similarities of one or more of said properties. In other embodiments however, there may be various alternative processing activity carried out on the image data obtained by the image sensor in order to characterise image data subsets.

Figures 6A, 6B, 6C:
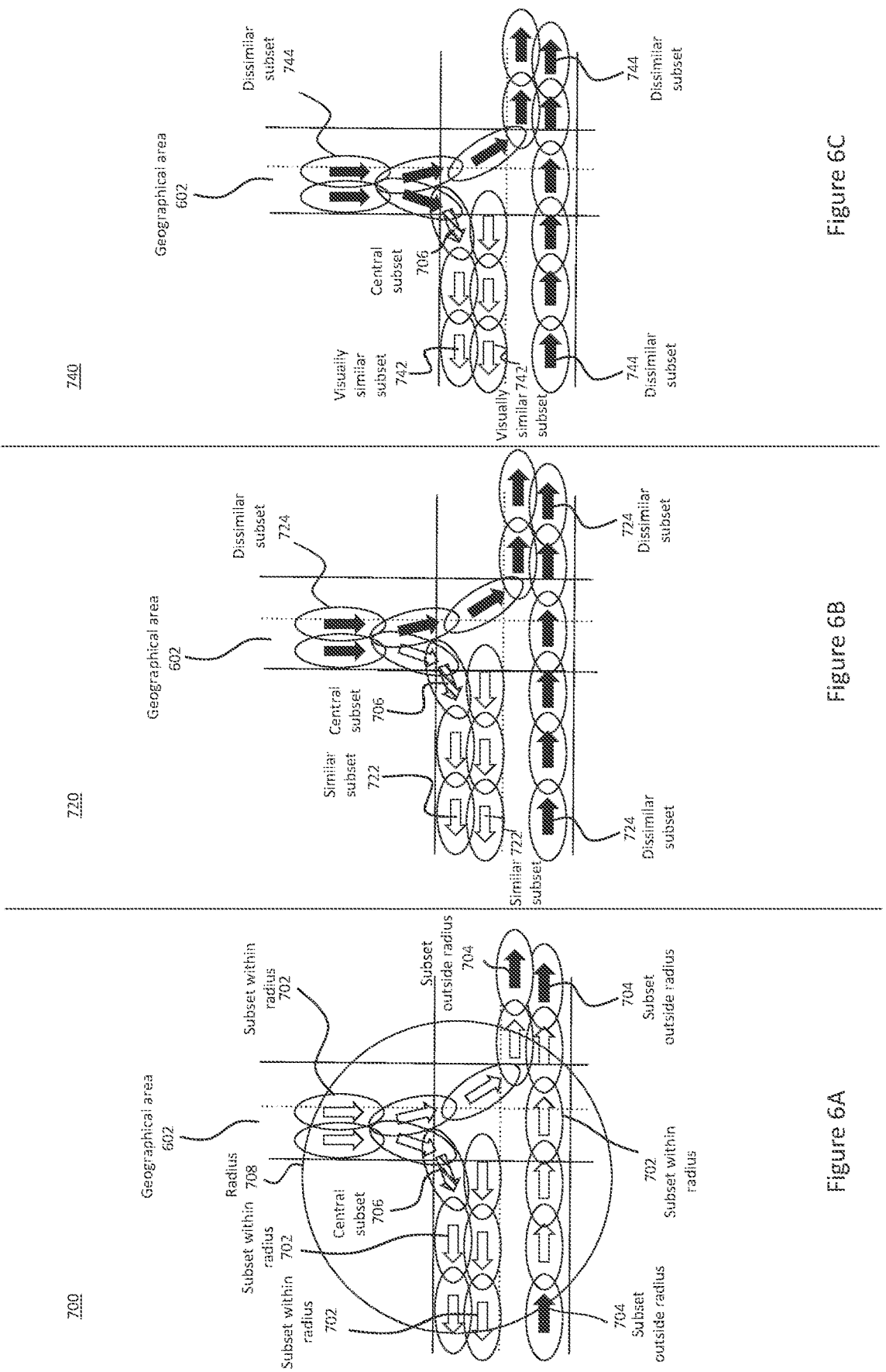
FIGS. 6A, 6B, and 6C illustrate example grouping of map segments based on location or pre-determined radius, orientation or pose, and visual similarity respectively.

FIGS. 6A, 6B, and 6C, illustrate the grouping of sequential image data, more particularly the grouping of subsets of sequential image data 622 into sets of image data suitable for map portion generation. Example embodiments can seek to identify images that can tie or match different subsets of image data together based on correlations of, for example, location similarity or orientation/pose similarity. In example embodiments, and as illustrated by FIGS. 6A, 6B, and 6C, each set of image data is typically built up from different subsets of image data, and "common" image frames are determined from overlapping or neighbouring subsets of image data with which to tie together the multiple data streams of images obtained within a geographical area 602.

As illustrated in FIG. 6A, for a geographical area 602, sequential image data can be grouped 700 together into subsets of sequential image data within a given radius 708 of a geographical area 602. In FIG. 6A, subsets of sequential image data 702 within the vicinity of a substantially central (central within the radius 708) image subset 706 are illustrated with unshaded arrows. Image subsets 704 which are not within the radius 708 are therefore not grouped as part of the same set of image data are illustrated with solid shading. The central subset 706 is illustrated with a striped arrow. Determining subsets of location similarity as illustrated by FIG. 6A, in order to determine a set of image data for constructing map portions, can help reduce computational costs as each subset is computed separately. Various methods may be used in determining the location similarity of subsets of sequential image data such assessing GPS location data, if available, for one or more of the images in each subset.

A grouped set of image data can be refined further by filtering based on factors such as directional/pose similarity and visual similarity as illustrated in FIGS. 6B and 6C, labelled 720 and 740 respectively. Subsets 722 in FIG. 6B are determined in this example to have location similarity and directional similarity to central image subset 706, whereas shaded subsets 724 are deemed not to be similar with regards both location and direction. FIG. 6C further narrows the map portion set of data by filtering out map segments with a lack of visual similarity as shown as the larger group of shaded dissimilar subsets 744.

Conditions change constantly even for the same paths taken by multiple transportation vehicles. For example, a vehicle obtaining image data may be following behind a larger vehicle blocking its view. In such scenarios, the imaging device cannot obtain image data to be used to reconstruct a robust map due to the occlusion. Thus, in order to overcome such situations, in some embodiments the map generation system 404 may run a sparse matching algorithm. Sparse matching algorithms essentially take image frames from one subset and matches them to a sub-set of image frames in another subset; if there is a confident enough match, then it is determined as a confidence of orientation/pose similarity. Hence, the sparse matching algorithm can be implemented in order to filter out image data and to only include substantially reliable image data for the alignment phase.

FIG. 7 illustrates, for the geographical area 604, a newly defined set of image data 800 encompassing map segments/data subsets 804 that have been determined to have location similarity within radius 708, and directional similarity and visual similarity to a central map segment/data subset 804'. In some embodiments, further features or "metadata" that can be used for associating image data for map generation include, however is not limited to, Global Positioning System (GPS) data, Inertial Measurement Unit (IMU) data, and timestamp measurements.

In example embodiments, operations are run in order of ascending computational complexity, such that computationally cheaper operations can be used to filter out subsets that are too dissimilar first, in order to avoid the most computationally intense criteria when it is unnecessary.

Imaging techniques for mapping often fail when the relative angle i.e. the orientation among images are too large. Using orientation similarity can be key to achieving visual coverage, since it encourages creating sets of image data with smooth variations in viewpoint. Grouping based on visual similarity mitigates this problem as images within sets change smoothly between viewpoints.

FIG. 4 shows a step of "graph cutting" (alternatively termed "similarity grouping") 514 which will now be described in detail with reference to FIG. 8A, 8B, and FIG. 9. The graph-cutting process for determining sets of image data includes two steps—namely, graph construction and graph partition.

Figure 8B:
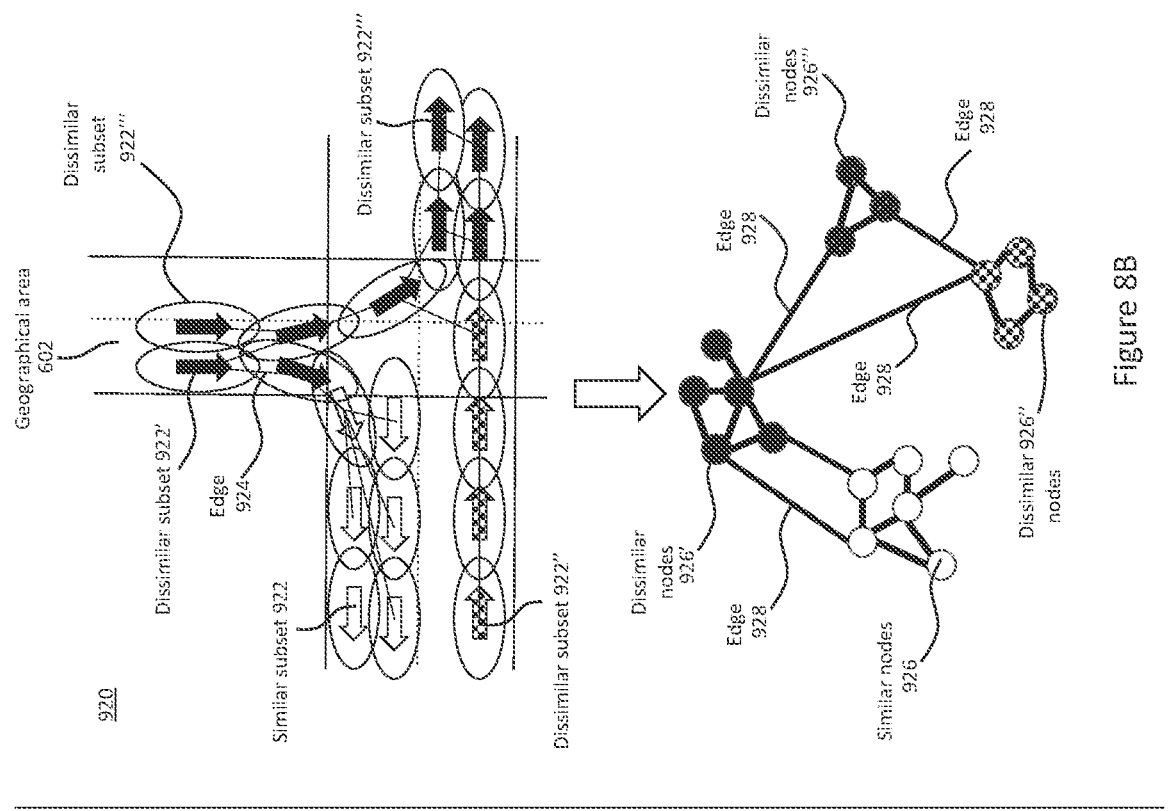
Figure 8A:
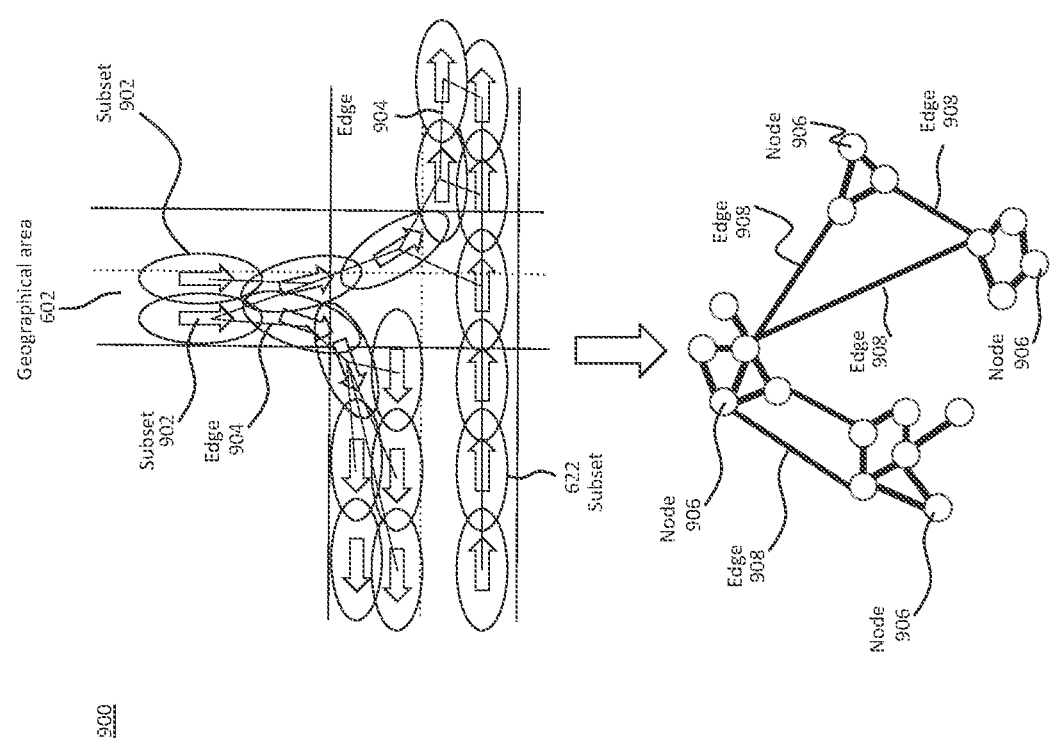

As shown as in FIG. 8, graph construction involves comparing each subset 902 with other subsets within its vicinity, for example within a distance threshold, and calculating the difference in orientation or pose, and visual properties using imaging techniques. A graph can then be constructed from similarity information between image data by representing each of the subsets of image data 902, 922 as a nodes 906, 926 and edges 904, 908, 924, 928 in FIGS. 8A and 8B respectively weighted by the determined similarities. In FIG. 8B, nodes subsets containing similar properties 922, 922', 922", and 922'" are grouped as similar nodes 926, 926', 926", and 926'" respectively in the graph. Edges 908, for example, may only be between nodes 926 for those with positional distance below a threshold. In example embodiments, edges 928 can be built between each node 926 with weightings, 'w', indicative of similarity to neighbouring subsets. The weighting of image subsets can for example provide a threshold for the inclusion or exclusion of certain images within the image data received. Thus, reconstructing a map portion 520 with these images excluded can substantially minimise error from poor image data. Typically, this can result in one-thousand subsets with fifty or more edges and weightings each for neighbouring subsets for a section of the map. By assessing similarities based on the various properties of image data and their thresholds, the number of edges for each node, or subset, can be reduced. In some embodiments, a graph may be constructed using only straight subsets, and similarly for turn subsets, and computed simultaneously for efficient map generation.

Figure 9:
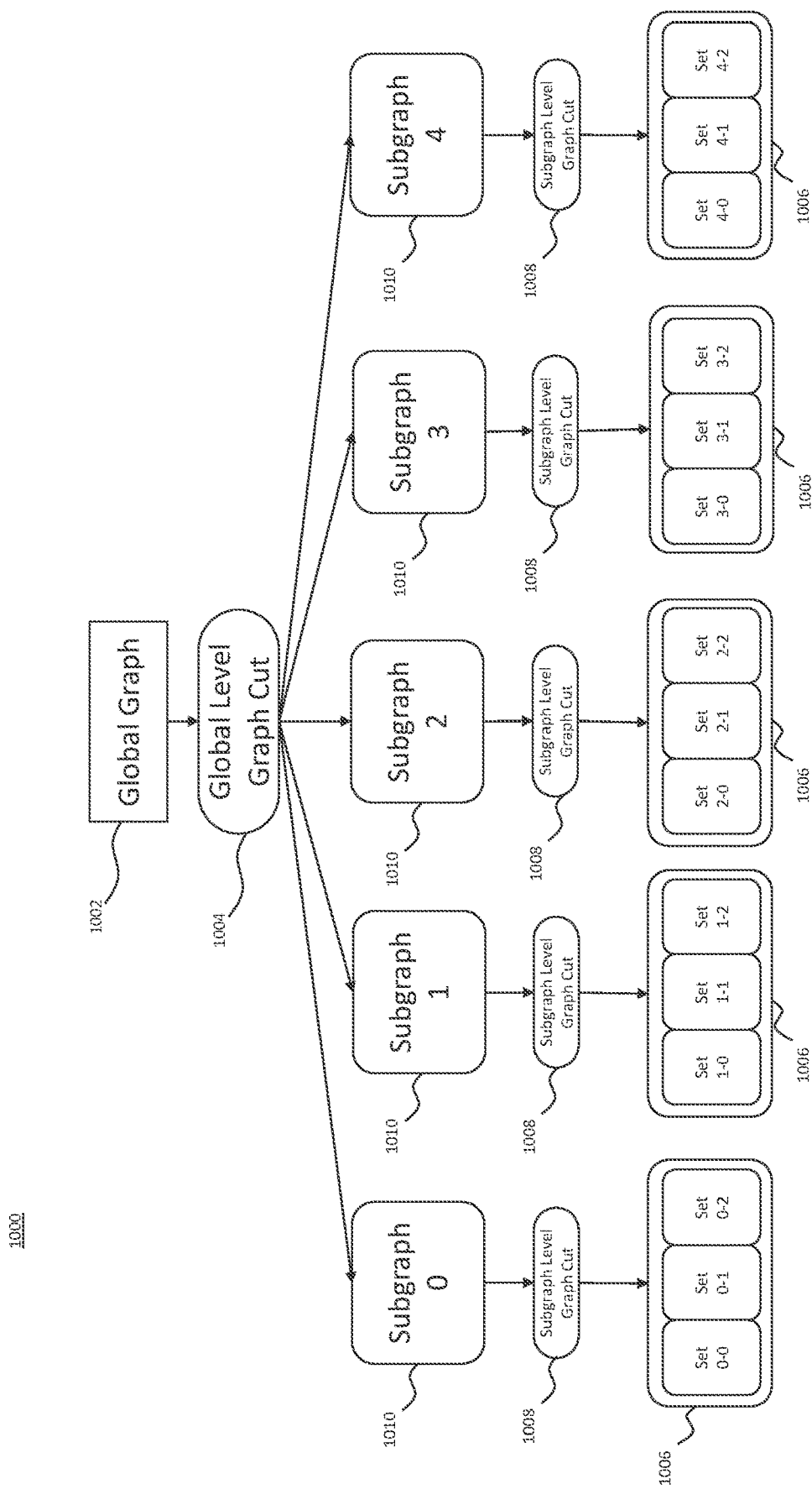
FIG. 9 shows a layered overview of the method of cutting a global graph into map portions for map generation according to an embodiment.

In example embodiments, image data in a global graph 1002 can be determined 1000 to be excluded during the graph cutting stage 1004 shown in FIG. 9 if it is deemed too weakly connected to other image frames. For example, a transportation vehicle may be travelling behind a larger vehicle thus substantially blocking the view of the imaging device. Images obtained from such scenarios may not add value to the map generation system 404 and can be excluded or filtered from the process. Given the graph construction, each output set of image data 1006 from graph partitioning will contain subsets that have one or more similarities of location, orientation, and/or visual properties, which increases the chances of success of visual mapping techniques for map (re)construction.

Each output subgraph, as shown as 1010 in FIG. 9, will correspond to a set of image data 1006, which can be constructed using imaging techniques. Using subgraph level graph cuts, as shown as 1008, assists in producing sets containing images that are similar in orientation and also visually, which maximises the chances of imaging techniques being successful in map generation. Using orientation is very important for visual coverage as it is key towards achieving robustness, as it enables producing a map for most of the submaps.

In example embodiments, once a global graph 1002 has been constructed, graph partitioning algorithms can be run, which will recursively "cut" the global graph 1002 into smaller sets of image data until the sets are of reasonable size, which can be a predefined number of sets, smaller than the input parameter. For substantially optimal graph cuts 1004, maximum similarities within sets are maintained. Graph cutting methods produce subgraphs 1010 where nodes are similar to each other, as shown as 926, according to the similarity encoded in the edges 928.

While a generic graph cutting algorithm can be used which measures both dissimilarity between the different subgraphs as well as the similarity within the individual subgraphs, typically minimum cuts, normalise cuts, or recursive normalise binary cuts are implemented. Minimum cut algorithms determine cuts with minimum weightings however will result in groups containing very few nodes. Normalise cuts and recursive normalise binary cuts also determine cuts with minimum weightings but output more balanced groups of nodes, thus allowing for better control over map portion size.

The purpose of the recursive graph cuts is not just to create sets of image data of reasonable size, but also to optimise inter-set similarities, such that the global graph is split into sets of image data where the frames in each set have maximum similarities between themselves.

FIG. 9 shows two levels of graph cut, first a global graph cut and secondly a sub-graph level graph cut. The purpose of the global graph cut is to allow a very large graph to be divided into smaller subgraphs without too high a computation complexity. The second level sub-graph graph cut is more computationally expensive but allows a high degree of optimization based on the visual similarity within a batch/dataset.

The graph cutting process described can create sets of image data where reconstructing the sub map within the sets has a high confidence factor of working robustly and accurately.

Optionally, a second sweep/process is performed which creates alignment sets of image data by grouping turn subsets and straight subsets into sets of image data also.

In example embodiments, as shown in FIG. 9 the subsets of sequential image data are then used to generate specified sets of image data 1006 using SfM techniques. Each set of image data consists of substantially correlated subsets which can ensure substantially high quality reconstruction of each map portion. Some embodiments may also take into consideration IMU or GPS data or other additional constraints for the map (re)construction process. In example embodiments, the subsets and sets generated can be filtered based on a success metric for the SfM performed.

In example embodiments, sets of image data can be categorised for simultaneous processing. For example, sets can be categorised as 1) straight sets, a group or collection of straight subsets with an average image frame of one dominant pose; and 2) turn sets, a group or collection of turn subsets with an average image frame of two or more dominant poses. Typically, in embodiments, a set of image data of approximately one-thousand image frames is used as this amount of data typically covers enough of a particular environment to be mapped and at the same time does not take up intractable amounts of computational time to process. This approach substantially provides robustness when using single viewpoint or limited field of view cameras as a data source.

As robustness correlates to the volume of data, in order to distribute computation across different sets of image data, it is desirable to build maps of large geographical areas using a scalable system to efficiently process the large amount of data that may be obtained as increasingly robust maps are created. Guided map generation provides a substantially significant increase in probability that imaging techniques will successfully build accurate maps from identified sets of image data. As described, the use of subsets of sequential image data also makes the set generation step scalable, as the grouping happens at the level of subsets of sequential image data rather than at global map level.

In example embodiments, for alignment 518 of sets of image data as shown in FIG. 4, turn sets are overlapped onto straight sets. During this process, heavily similar or corresponding image frames from both straight sets and turn sets are determined and used as connection or interlocking points in generating a map. In embodiments, it can be advantageous to determine important properties including position, pose, and visually matching (i.e. visually similar) parts of image frames, in order to determine substantially overlapping or neighbouring sets of image data to generate a map of substantially high quality. In some embodiments, the order in which these three properties are determined can reduce the associated costs of computing required.

In some embodiments, one or more photogrammetric imaging techniques, SfM 516, may be further implemented prior to alignment 518 of sets of image data in order to output a map portion 520 or a fully generated global map. In some embodiments, the output of SfM may further include, however not limited to, a measurement or a 3D model of some real-world object or scene observed by the imaging device.

In some embodiments, sets of image data can be aligned using constraints-based optimisation with variables. Variables include, but are not limited to, poses of all of the images obtained by each mapping vehicle, and constraints include, but are not limited to, poses of images within each of the subsets of image data and the relative pose of images within each of the sets of image data.

In some embodiments, accuracy increasing techniques may be implemented such as pose graph optimisation and/or large scale bundle-adjusting of the global map.

Many variations to the example embodiments are possible. It should be appreciated that there can be additional, fewer, or alternative steps performed in similar or alternative orders, or in parallel, within the scope of the various embodiments discussed herein unless otherwise stated.

Figure 10:
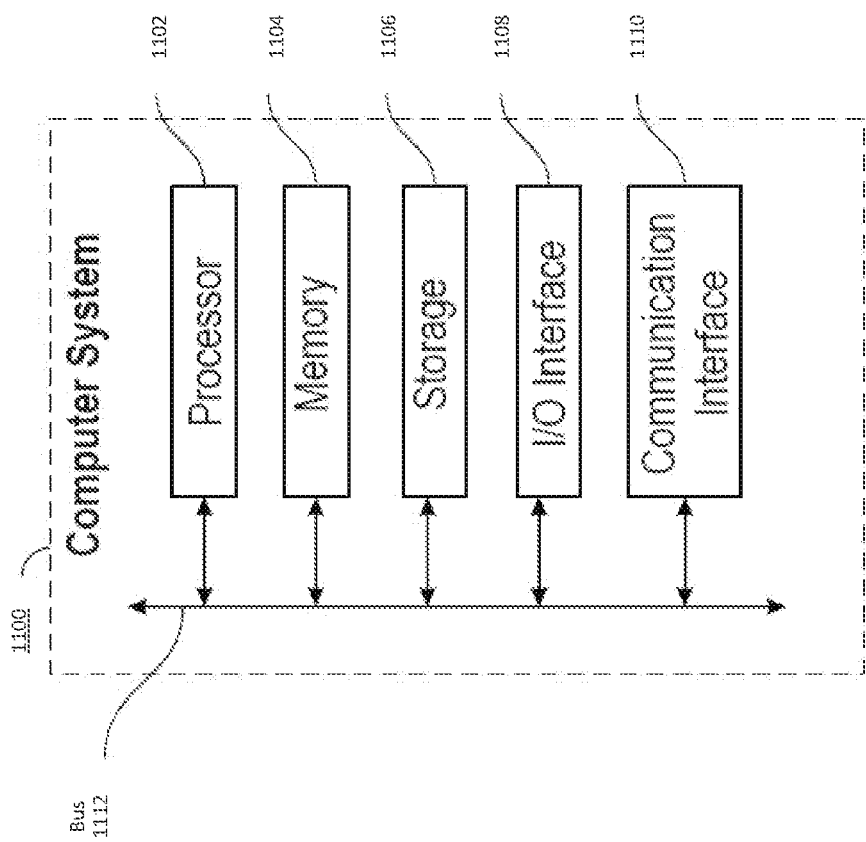
FIG. 10 illustrates an example of a computer system or computing device that can be utilized in various scenarios, with at least some embodiments.

FIG. 10 illustrates an example computer system 1100. In particular embodiments, one or more computer systems 1100 perform one or more steps of one or more methods described or illustrated herein. In particular embodiments, one or more computer systems 1100 provide the functionalities described or illustrated herein. In particular embodiments, software running on one or more computer systems 1100 performs one or more steps of one or more methods described or illustrated herein or provides the functionalities described or illustrated herein. Particular embodiments include one or more portions of one or more computer systems 1100. Herein, a reference to a computer system may encompass a computing device, and vice versa, where appropriate. Moreover, a reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example, and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 that are to be operated on by computer instructions; the results of previous instructions executed by processor 1102 that are accessible to subsequent instructions or for writing to memory 1104 or storage 1106; or any other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs), be a multi-core processor, or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example, and not by way of limitation, computer system 1100 may load instructions from storage 1106 or another source (such as another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described in further detail below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware or software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware or software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware or software, or both coupling components of computer system 1100 to each other. As an example and not by way of limitation, bus 1112 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

A map is a depiction of a whole area or a part of an area which emphasises the relationships between elements in space such as objects, landmarks, road signs, road names, or location. In some embodiments, a road map may display transport links and include points of interest, such as prominent buildings, tourism sites, recreational facilities, and airports. In example embodiments, maps or sections of a map may be dynamic and/or interactive with integration of an automatic or a semi-automatic system. In a semi-automated system, manual input may be used to adjust, correct, or update sections or whole of the map. In some embodiments, the map may be viewed using a user interface and may be shown as a variety of forms such as a topological map in the form of a schematic diagram, a multi-layer map, or a single corrected and substantially optimised global map or section of the map.

Image data obtained for processing by at least one image sensor attached to each of the transportation vehicles, in example embodiments, may be in the form of a raw image file in order to save, with minimum loss of information, data obtained from the sensor, and the conditions surrounding the capturing of the image, i.e. metadata. In example embodiments, in order to convert image metadata into a photographic rendering of a scene, and then store them as a standard graphical format, processing may be carried out locally within the image sensor, or in a raw-file converter, or by using a remote method. Typically, processing image data may include, but not limited to, decoding, defective pixel removal, noise reduction, compression, optical correction, or dynamic range compression.

In embodiments, raw and/or processed image data may be stored within a cloud storage which may be accessed through a web service application programming interface (API) or by applications that utilize the API, such as a cloud desktop storage, a cloud storage gateway, or web-based content management systems. Typically, data may be stored locally or remotely in order to efficiently access data. For image data obtained of the real world, decryption keys may be used in order to limit the access of data and securely store the data obtained by the use of image sensors.

Herein, "or" is inclusive and not exclusive, unless expressly indicated otherwise or indicated otherwise by context. Therefore, herein, "A or B" means "A or B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Methods described herein may vary in accordance with the present disclosure. Various embodiments of this disclosure may repeat one or more steps of the methods described herein, where appropriate. Although this disclosure describes and illustrates particular steps of certain methods as occurring in a particular order, this disclosure contemplates any suitable steps of the methods occurring in any suitable order or in any combination which may include all, some, or none of the steps of the methods. Furthermore, although this disclosure may describe and illustrate particular components, devices, or systems carrying out particular steps of a method, this disclosure contemplates any suitable combination of any suitable components, devices, or systems carrying out any suitable steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

Any system feature as described herein may also be provided as a method feature, and vice versa. As used herein, means plus function features may be expressed alternatively in terms of their corresponding structure.

Any feature in one aspect may be applied to other aspects, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects can be implemented and/or supplied and/or used independently.

We claim:

1. A computer-implemented method comprising:
   determining, by a computing system, a first set of images that includes first images associated with first locations that are within a first threshold distance of a first location and first poses within a first threshold deviation of a first average pose;
   determining, by the computing system, a second set of images that includes second images associated with second locations that are within a second threshold distance of a second location and second poses within a second threshold deviation of a second average pose;
   grouping, by the computing system, the first set of images and the second set of images together based on a first similarity of the first location and the second location and a second similarity of the first average pose and the second average pose;
   generating, by the computing system, a map portion based on the first set of images and the second set of images.

2. The computer-implemented method of claim 1, further comprising:
   determining, by the computing system, first deviations from the first average pose for the first set of images;

determining, by the computing system, a first directional path associated with the first set of images based on the first deviations;

determining, by the computing system, second deviations from the second average pose for the second set of images; and determining, by the computing system, a second directional path associated with the second set of images based on the second deviations, wherein the grouping is based on a third similarity between the first directional path and the second directional path.

3. The computer-implemented method of claim 1, further comprising:

determining, by the computing system, one or more first dominant poses for the first set of images; and determining, by the computing system, one or more second dominant poses for the second set of images, wherein the grouping is based on a third similarity between the one or more first dominant poses and the one or more second dominant poses.

4. The computer-implemented method of claim 1, further comprising:

determining, by the computing system, a first scene associated with the first set of image data;

determining, by the computing system, a second scene associated with the second set of image data, wherein the grouping is based on a third similarity between the first scene and the second scene.

5. The computer-implemented method of claim 1, further comprising:

determining, by the computing system, the first locations and the first poses based on first metadata associated with the first set of images; and determining, by the computing system, the second locations and the second poses based on second metadata associated with the second set of images.

6. The computer-implemented method of claim 1, wherein the grouping is based on a sparse matching comprising:

determining, by the computing system, the first location and the first average pose based on a subset of the first set of images;

determining, by the computing system, the second location and the second average pose based on a subset of the second set of images; and determining, by the computing system, a first confidence for the first similarity of the first location and the second location and a second confidence for the second similarity of the first average pose and the second average pose, wherein the grouping is based on a determination the first confidence satisfies a first confidence threshold and the second confidence satisfies a second confidence threshold.

7. The computer-implemented method of claim 1, wherein the grouping is based on a determination the first set of images and the second set of images correspond with overlapping trajectories.

8. The computer-implemented method of claim 1, further comprising:

aligning, by the computing system, the map portion in a global map based on images in the first set of images or the second set of images that are common with those in other map portions in the global map.

9. The computer-implemented method of claim 1, wherein the first set of images and the second set of images depict an object at evenly spaced poses around the object.

10. The computer-implemented method of claim 1, wherein the map portion includes a three-dimensional model of an object observed in the first set of images and the second set of images.

11. A system comprising:

at least one processor; and a memory storing instructions that, when executed by the at least one processor, cause the system to perform operations comprising:

determining a first set of images that includes first images associated with first locations that are within a first threshold distance of a first location and first poses within a first threshold deviation of a first average pose;

determining a second set of images that includes second images associated with second locations that are within a second threshold distance of a second location and second poses within a second threshold deviation of a second average pose;

grouping the first set of images and the second set of images together based on a first similarity of the first location and the second location and a second similarity of the first average pose and the second average pose;

generating a map portion based on the first set of images and the second set of images.

12. The system of claim 11, the operations further comprising:

determining first deviations from the first average pose for the first set of images;

determining a first directional path associated with the first set of images based on the first deviations;

determining second deviations from the second average pose for the second set of images; and determining a second directional path associated with the second set of images based on the second deviations, wherein the grouping is based on a third similarity between the first directional path and the second directional path.

13. The system of claim 11, the operations further comprising:

determining one or more first dominant poses for the first set of images; and determining one or more second dominant poses for the second set of images, wherein the grouping is based on a third similarity between the one or more first dominant poses and the one or more second dominant poses.

14. The system of claim 11, the operations further comprising:

determining a first scene associated with the first set of image data;

determining a second scene associated with the second set of image data, wherein the grouping is based on a third similarity between the first scene and the second scene.

15. The system of claim 11, the operations further comprising:

determining the first locations and the first poses based on first metadata associated with the first set of images; and determining the second locations and the second poses based on second metadata associated with the second set of images.

16. A non-transitory computer-readable storage medium including instructions that, when executed by at least on processor of a computing system, cause the computing system to perform operations comprising:

determining a first set of images that includes first images associated with first locations that are within a first threshold distance of a first location and first poses within a first threshold deviation of a first average pose;

determining a second set of images that includes second images associated with second locations that are within a second threshold distance of a second location and second poses within a second threshold deviation of a second average pose;

grouping the first set of images and the second set of images together based on a first similarity of the first location and the second location and a second similarity of the first average pose and the second average pose;

generating a map portion based on the first set of images and the second set of images.

17. The non-transitory computer-readable storage medium of claim 16, the operations further comprising:

determining first deviations from the first average pose for the first set of images;

determining a first directional path associated with the first set of images based on the first deviations;

determining second deviations from the second average pose for the second set of images; and determining a second directional path associated with the second set of images based on the second deviations, wherein the grouping is based on a third similarity between the first directional path and the second directional path.

18. The non-transitory computer-readable storage medium of claim 16, the operations further comprising:

determining one or more first dominant poses for the first set of images; and determining one or more second dominant poses for the second set of images, wherein the grouping is based on a third similarity between the one or more first dominant poses and the one or more second dominant poses.

19. The non-transitory computer-readable storage medium of claim 18, the operations further comprising:

determining a first scene associated with the first set of image data;

determining a second scene associated with the second set of image data, wherein the grouping is based on a third similarity between the first scene and the second scene.

20. The non-transitory computer-readable storage medium of claim 16, the operations further comprising:

determining the first locations and the first poses based on first metadata associated with the first set of images; and determining the second locations and the second poses based on second metadata associated with the second set of images.

* * * * *